United States Patent
Su et al.

(10) Patent No.: US 9,348,397 B2
(45) Date of Patent: May 24, 2016

(54) METHOD OF POWER MANAGEMENT, PORTABLE SYSTEM AND PORTABLE POWER BANK

(71) Applicants: National Taiwan Normal University, Taipei (TW); Healthife Co., Ltd., Tainan (TW)

(72) Inventors: Yu-Shan Su, Taipei (TW); Han-Chao Chang, Hsinchu (TW); Chien-Kai Chung, Miaoli County (TW); Min-Wei Hung, Hsinchu (TW); Jyun-Yi Lai, Hsinchu (TW); Shih-Feng Tseng, Zhubei (TW); Wen-Tse Hsiao, Hsinchu (TW); I-Lin Wu, Tainan (TW)

(73) Assignees: NATIONAL TAIWAN NORMAL UNIVERSITY, Taipei (TW); HEALTHIFE CO., LTD., Tainan (TW)

( * ) Notice: Subject to any disclaimer, the term of this patent is extended or adjusted under 35 U.S.C. 154(b) by 205 days.

(21) Appl. No.: 14/227,643

(22) Filed: Mar. 27, 2014

(65) Prior Publication Data
US 2015/0033046 A1   Jan. 29, 2015

(30) Foreign Application Priority Data
Jul. 26, 2013   (TW) .............................. 102126927 A

(51) Int. Cl.
G06F 1/26 (2006.01)
G06F 1/32 (2006.01)

(52) U.S. Cl.
CPC .............. G06F 1/3212 (2013.01); G06F 1/263 (2013.01); G06F 1/266 (2013.01); Y02B 60/1292 (2013.01)

(58) Field of Classification Search
CPC ........... G06F 1/26; G06F 1/263; G06F 1/266; G06F 1/3212
USPC .......................................... 713/300, 320, 330
See application file for complete search history.

(56) References Cited

U.S. PATENT DOCUMENTS

| 2014/0274220 A1* | 9/2014 | Chiu | ...................... | H04M 19/08 455/573 |
| 2014/0354050 A1* | 12/2014 | Kung | .................... | H02J 7/0068 307/24 |

* cited by examiner

Primary Examiner — Michael J Brown
(74) Attorney, Agent, or Firm — Birch, Stewart, Kolasch & Birch, LLP

(57) ABSTRACT

A method of power management is to be implemented by a portable electronic device coupled to a portable power bank. The portable power bank is further coupled to an electrical appliance. In the method, the portable electronic device receives power information from the portable power bank, and controls the portable power bank to operate in one of a first mode, in which electrical power is provided to the electrical appliance, and a second mode, in which electrical power is not provided to the electrical appliance, based on whether or not the portable power bank has sufficient amount of power.

12 Claims, 4 Drawing Sheets

METHOD OF POWER MANAGEMENT, PORTABLE SYSTEM AND PORTABLE POWER BANK

CROSS-REFERENCE TO RELATED APPLICATION

This application claims priority of Taiwanese Application No. 102126927, filed on Jul. 26, 2013.

BACKGROUND OF THE INVENTION

1. Field of the Invention

The invention relates to a method and a system of power management, more particularly to a method and a system of power management that incorporates a portable electronic device, a portable power bank, and an electrical appliance.

2. Description of the Related Art

Portable electronic devices such as mobile devices, with their ever-expanding functionalities, have become an integral part of modern life.

In addition to the mobile devices, a number of portable electrical accessories, such as an electrical fan, are also available. Each of the electrical accessories may have a built-in battery, or may be coupled to a mobile device so as to operate using electrical energy stored in the battery of the mobile device.

However, as use become more frequent, the corresponding power consumption of the battery of the mobile device increases rapidly. Since the capacity of batteries of mobile devices are somewhat limited due to the overall size limitation of the mobile devices, the mobile devices may need to be recharged by connecting to an electrical power outlet or an electronic host machine (e.g., a personal computer) that has a universal serial bus (USB) interface.

When the above options are not available, a portable power bank, which is configured specifically to store a large amount of electrical energy, is then utilized to prolong the service time of the mobile device and the portable electrical accessories. However, the portable electrical accessories may employ interfaces different from those of the mobile device, and additional transmission wires may be required to charge the portable electrical accessories. Moreover, since the mobile device is usually considered to have a higher priority over the portable electrical accessories, it may be beneficial to provide a mechanism for selectively providing electrical power to the mobile device and the portable electrical accessories.

SUMMARY OF THE INVENTION

Therefore, the object of the present invention is to provide a method of power management that is capable of alleviating at least one of the aforementioned drawbacks of the prior art.

Accordingly, a method of power management of the present invention is to be implemented by a portable electronic device. The portable electronic device is coupled to a portable power bank. The portable power bank is further coupled to an electrical appliance. The method comprises the following steps of:

(a) receiving, by the portable electronic device, power information from the portable power bank;

(b) controlling, by the portable electronic device, the portable power bank to operate in a first mode, in which electrical power is provided to the electrical appliance, when the portable electronic device determines from the power information that the portable power bank has sufficient amount of power; and (c) controlling, by the portable electronic device, the portable power bank to operate in a second mode, in which electrical power is not provided to the electrical appliance, when the portable electronic device determines from the power information that the portable power bank does not have sufficient amount of power.

Another object of the present invention is to provide a portable system capable of providing electric power to an electrical appliance. The portable system comprises a portable electronic device and a portable power bank. The portable power bank is coupled to the portable electronic device, and is to be further coupled to the electrical appliance.

The portable electronic device is configured to:

receive power information from the portable power bank;

control the portable power bank to operate in a first mode, in which electrical power is provided to the electrical appliance, when the portable electronic device determines from the power information that the portable power bank has sufficient amount of power; and control the portable power bank to operate in a second mode, in which electrical power is not provided to the electrical appliance, when the portable electronic device determines from the power information that the portable power bank does not have sufficient amount of power.

Yet another object of the present invention is to provide a portable power bank for use with a portable electronic device and an electrical appliance. The portable power bank comprises a communication interface, a power outputting module, a power transferring port, a switching unit, and a control unit.

The communication interface is configured for coupling to the portable electronic device. The power transferring port is configured for coupling to the electrical appliance. The switching unit is coupled between the power outputting module and the power transferring port. The switching unit is further operable to make or break a circuit path between the power outputting module and the power transferring port.

The control unit is coupled to the communication interface, the power outputting module, and the switching unit. Moreover, the control unit is responsive to control from the portable electronic device to control switching operation of the switching unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
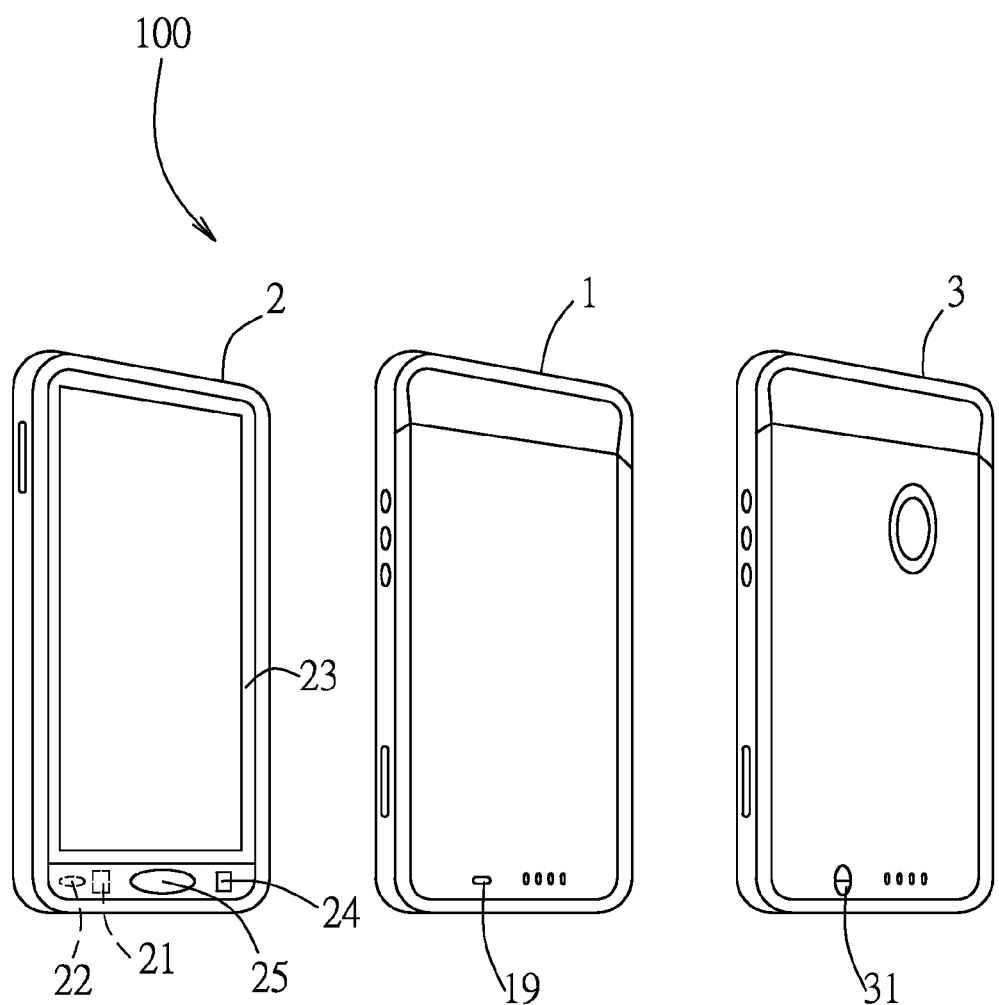
FIG. 1 is a schematic view of a preferred embodiment of a portable system for providing electrical power to an electrical appliance, according to the invention.

As shown in FIG. 1, the preferred embodiment of a portable system 100 according to the present invention comprises a portable power bank 1 and a portable electronic device 2. The portable system 100 is capable of providing electric power to an electrical appliance 3. In this embodiment, the electrical appliance 3 may be, for example, an electrical fan, a mist sprayer, an electrical powder puff machine, etc.

When the portable power bank 1 is coupled to the portable electronic device 2, electric power stored in the portable power bank 1 is provided to the portable electronic device 2. When the portable power bank 1 is coupled to both the portable electronic device 2 and the electrical appliance 3, the portable electronic device 2 is operable to control the portable power bank 1 to selectively provide electric power to the electrical appliance 3. This can be done by executing a proprietary application program in the electronic device 2.

The portable electronic device 2 includes a processor 21, a transmission unit 22, an output unit 23, a memory unit 24 and an input interface 25. The output unit 23 may include a display screen and a speaker. The memory unit 24 stores the application program therein, and the application program includes instructions that, when executed by the processor 21, cause the portable electronic device 2 to perform a method of power management of this invention.

Figure 2:
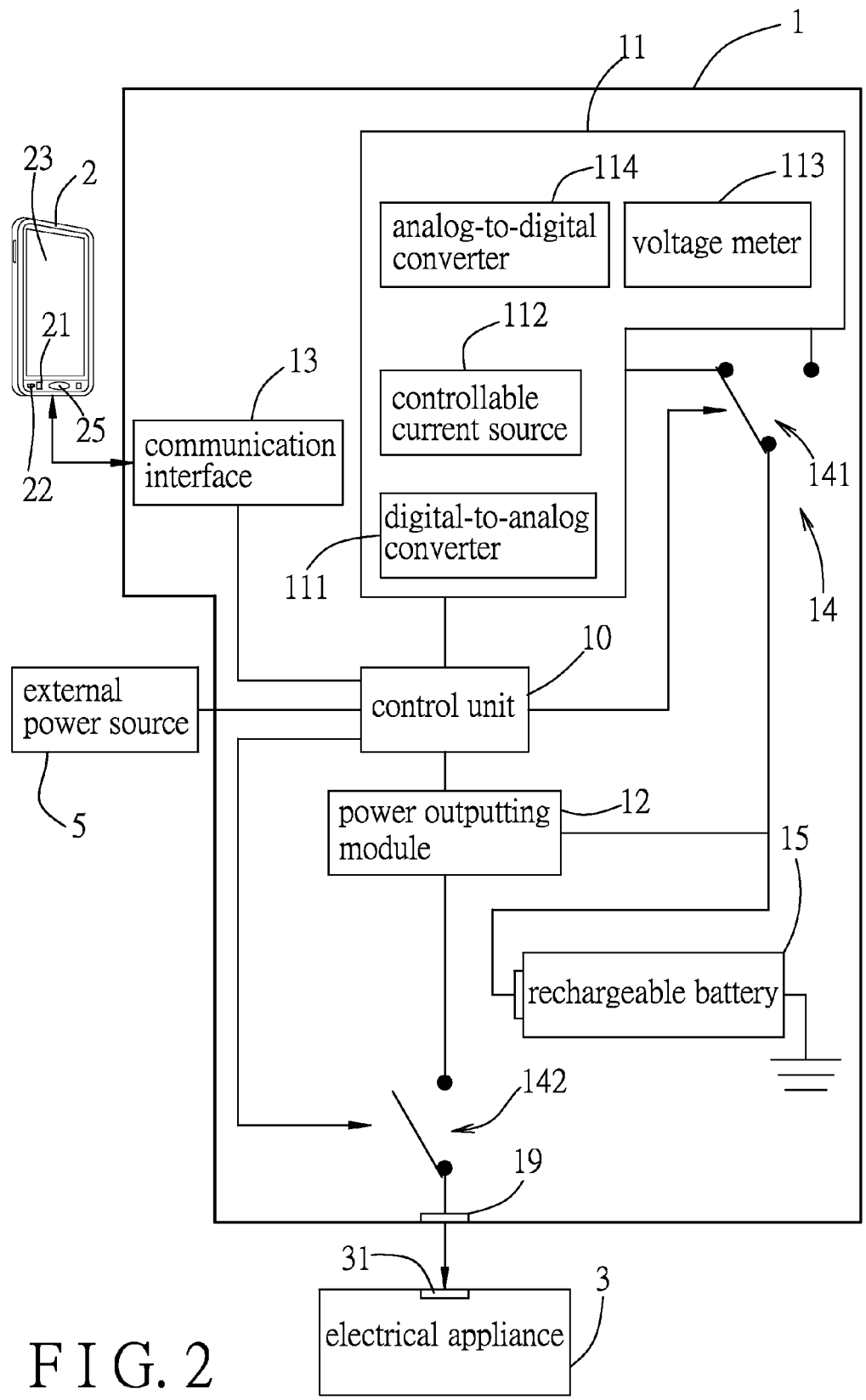
FIG. 2 is a schematic circuit block diagram of the portable system, illustrating components of a portable power bank.

As shown in FIG. 2, the portable power bank 1 includes a control unit 10, an information acquiring module 11, a power outputting module 12, a communication interface 13, a switch module 14, a rechargeable battery 15, and a power transferring port 19.

The information acquiring module 11 is coupled to the control unit 10, and is configured to acquire power information corresponding to the rechargeable battery 15. The power outputting module 12 is coupled to the control unit 10 and the rechargeable battery 15, and is controlled by the control unit 10 to generate a preset output voltage (5 volts in this embodiment) for recharging the electrical appliance 3.

The communication interface 13 is able to communicate with the portable electronic device 2 via the transmission unit 22. That is, the portable power bank 1 is configured to receive signals from the portable electronic device 2, and in turn, the control unit 10 is controlled by the portable electronic device 2 to control operations of components of the portable power bank 1.

The switch module 14 includes a first switching unit 141 and a second switching unit 142, and is coupled to and controlled by the control unit 10 to make or break circuit paths between components of the portable power bank 1.

In this embodiment, sizes of the portable power bank 1 and the portable electronic device 2 are close to that of the electrical appliance 3. A connector (not shown in the drawings) may be attached to the portable power bank 1 for coupling directly to the portable electronic device 2.

The portable power bank 1 may be coupled to the electrical appliance 3 using the power transferring port 19 of the portable power bank 1 and a connecting port 31 of the electrical appliance 3. Specifically, the power transferring port 19 and the connecting port 31 may be embodied using exposed electrically conductive metal contacts, thereby eliminating the requirement of an electrical wire. Similarly, the communication interface 13 and the transmission unit 22 may be embodied using exposed electrically conductive metal contacts as well.

The portable power bank 1 may be operated in a number of modes. When coupled to an external power source 5 (e.g., via an alternating current (AC) power socket), the portable power bank 1 is operated in a recharge mode. Here, the control unit 10 makes a circuit path between the external power source 5 and the rechargeable battery 15. Specifically, the first switching unit 141 is controlled to interconnect the information acquiring module 11 and the rechargeable battery 15, and electrical power can be transmitted through the control unit 10, the information acquiring module 11 and the first switching unit 141 to the rechargeable battery 15.

In this embodiment, the information acquiring module 11 includes a digital-to-analog converter (DAC) 111 and a controllable current source 112. Upon receipt of the electrical power from the external power source 5, the control unit 10 generates a digital control signal. The DAC 111 is responsive to a digital control signal from the control unit 10 to generate an analog charging signal. The controllable current source 112 receives the analog charging signal and generates a charging electrical current, which is provided to the rechargeable battery 15.

The information acquiring module 11 further includes a voltage meter 113 and an analog-to-digital converter (ADC) 114 for performing operations to acquire the power information.

It is worth noting that, when the portable power bank 1 is operated in the recharge mode, the portable power bank 1 may be also coupled to the portable electronic device 2 and the electrical appliance 3 at the same time. Through the application software executed by the portable electronic device 2, electrical power may be selectively provided to the portable electronic device 2 and the electrical appliance 3.

When coupled only to the portable electronic device 2, the portable power bank 1 is operated in a single discharging mode. Here, the control unit 10 controls the power outputting module 12 to provide the electrical power stored in the rechargeable battery 15 to the portable electronic device 2.

When coupled to both the portable electronic device 2 and the electrical appliance 3, the portable power bank 1 is operated in a dual discharging mode. Here, the control unit 10 controls the power outputting module to provide the electrical power stored in the rechargeable battery 15 to the portable electronic device 2, and to selectively provide the electrical power to the electrical appliance 3.

Figure 3:
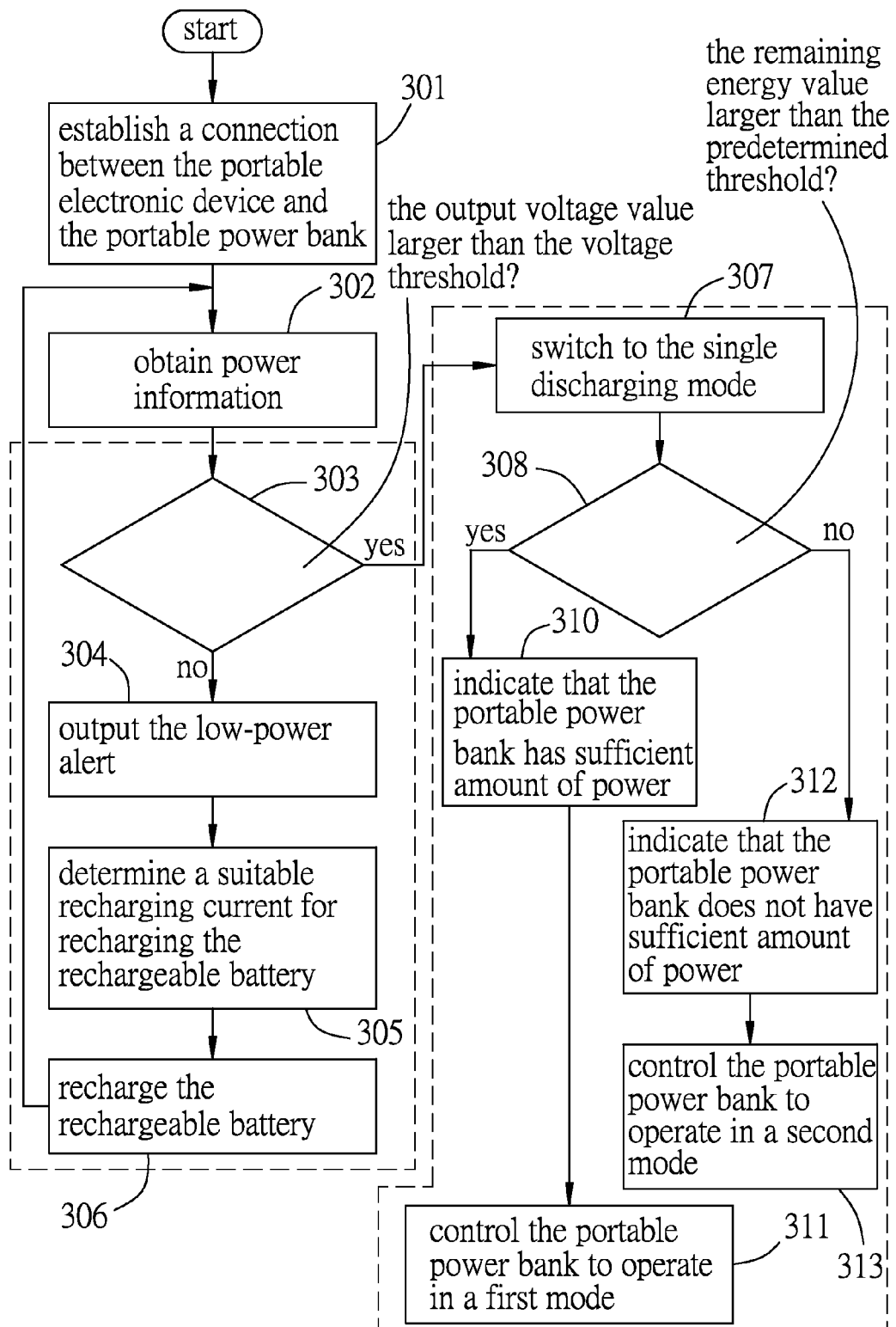
FIG. 3 is a flowchart illustrating steps of a method for power management, according to the preferred embodiment.

Further referring to FIG. 3, details of the method of power management of this invention will now be described. A user may operate the input interface 25 to instruct the processor 21 to execute the application program on the portable electronic device 2 in order to start power managing operations.

In step 301, a connection between the portable electronic device 2 and the portable power bank 1 is established. That is, the transmission unit 22 and the communication interface 13 are connected.

In step 302, the portable electronic device 2 is operable to send an information request to the control unit 10 via the communication interface 13. Consequently, the control unit 10 is responsive to the information request from the portable electronic device 2 to control the information acquiring module 11 for acquiring the power information, and to send the power information to the portable electronic device 2 via the communication interface 13.

The transmitted power information may include an output voltage value corresponding to an output voltage that is outputted by the rechargeable battery 15, and a remaining energy value corresponding to a remaining electrical energy of the rechargeable battery 15.

Details of how the information acquiring module 11 acquires the power information are now described. When it is intended to acquire the power information, the control unit 10 controls the first switching unit 141 to make a circuit path between the information acquiring module 11 and the rechargeable battery 15.

The voltage meter 113 is then configured to detect an open-circuit voltage of the rechargeable battery 15, which can be obtained when the rechargeable battery 15 is not applied with a load (e.g., a resistor). Furthermore, the ADC 114 is configured to convert the open-circuit voltage detected by the voltage meter 113 to an open-circuit voltage value. The control unit 10 is configured to derive a remaining energy value of the rechargeable battery 15 from the open-circuit voltage value obtained by the ADC 114.

In this embodiment, the control unit 10 compares the open-circuit voltage value with a pre-obtained full voltage value that corresponds to the open-circuit voltage value obtained when the rechargeable battery 15 is fully charged. Then, the control unit 10 derives the remaining energy value as a percentage of a full power that can be stored in the rechargeable battery 15.

Alternatively, when the rechargeable battery 15 is coupled to the load, the voltage meter 113 is operable to obtain an output voltage that is outputted by the rechargeable battery 15. Subsequently, the control unit 10 is configured to derive the output voltage value that corresponds to the output voltage.

The remaining energy value and the output voltage value may be then transmitted to the portable electronic device 2 as part of the power information.

In step 303, the portable electronic device 2 determines whether the portable power bank 1 needs to be recharged, based on the output voltage value. For example, the portable electronic device 2 may compare the output voltage value with a voltage threshold (3.5 volts in this embodiment) stored in the memory unit 24. When the output voltage value is lower than the voltage threshold, the portable electronic device 2 determines that the portable power bank 1 is not capable of providing electrical power properly and is required to be recharged. Otherwise, when the output voltage value is larger than the voltage threshold, the flow proceeds to step 307.

In step 304, the processor 21 of the portable electronic device 2 generates a low-power alert and outputs the low-power alert using the output unit 23. The low-power alert indicates that the portable power bank 1 is currently not capable of functioning properly (i.e., cannot provide electrical power to the portable electronic device 2 and the electrical appliance 3), and must be coupled to the external power source 5 for recharging.

After the portable power bank 1 is coupled to the external power source 5, in step 305, the control unit determines a suitable recharging current for recharging the rechargeable battery 15. In this embodiment, the control unit 10 dynamically derives the suitable recharging current according to the remaining energy value using a look-up table.

In step 306, the control unit 10 generates the digital control signal for the ADC 111, which in turn controls the controllable current source 112 to recharge the rechargeable battery 15. During this step, the portable power bank 1 may provide electrical power to the portable electronic device 2 and/or the electrical appliance 3.

After the portable power bank 1 is disconnected from the external power source 5, the flow goes back to step 302.

In step 307, the portable electronic device 2 controls the portable power bank 1 to switch to the single discharging mode.

In step 308, the portable electronic device 2 determines whether the portable power bank 1 is suitable to operate in the dual discharging mode. That is, the portable electronic device 2 determines, from the power information, whether the portable power bank 1 has sufficient amount of power to support charging of both the portable electronic device 2 and the electrical appliance 3. In this embodiment, the portable electronic device 2 compares the remaining energy value included in the power information to a predetermined threshold stored in the portable electronic device 2. The predetermined threshold may be, for example, 40 percent of the full power. When the portable electronic device determines that the portable power bank 1 has sufficient amount of power, the flow proceeds to step 310. Otherwise, the flow proceeds to step 312.

In step 310, the processor 21 generates a first message for indicating that the portable power bank 1 has sufficient amount of power, and the output unit 23 is configured to output the first message.

In step 311, the portable electronic device 2 controls the portable power bank 1 to operate in a first mode, in which electrical power is provided to the electrical appliance 3 (i.e., the dual discharge mode). Specifically, the second switching unit 142 is controlled by the control unit 10 to make a circuit path between the power outputting module 12 and the power transferring port 19, to which the electrical appliance is coupled. The power outputting module 12 then provides the preset output voltage (e.g., 5 volts) to the power transferring port 19.

In step 312, the processor 21 generates a second message for indicating that the portable power bank 1 does not have sufficient amount of power, and the output unit 23 is configured to output the second message.

In step 313, the portable electronic device 2 controls the portable power bank 1 to operate in a second mode, in which electrical power is not provided to the electrical appliance 3 (i.e., the single discharge mode). Specifically, the second switching unit 142 is controlled by the control unit 10 to break the circuit path between the power outputting module 12 and the power transferring port 19.

Figure 4:
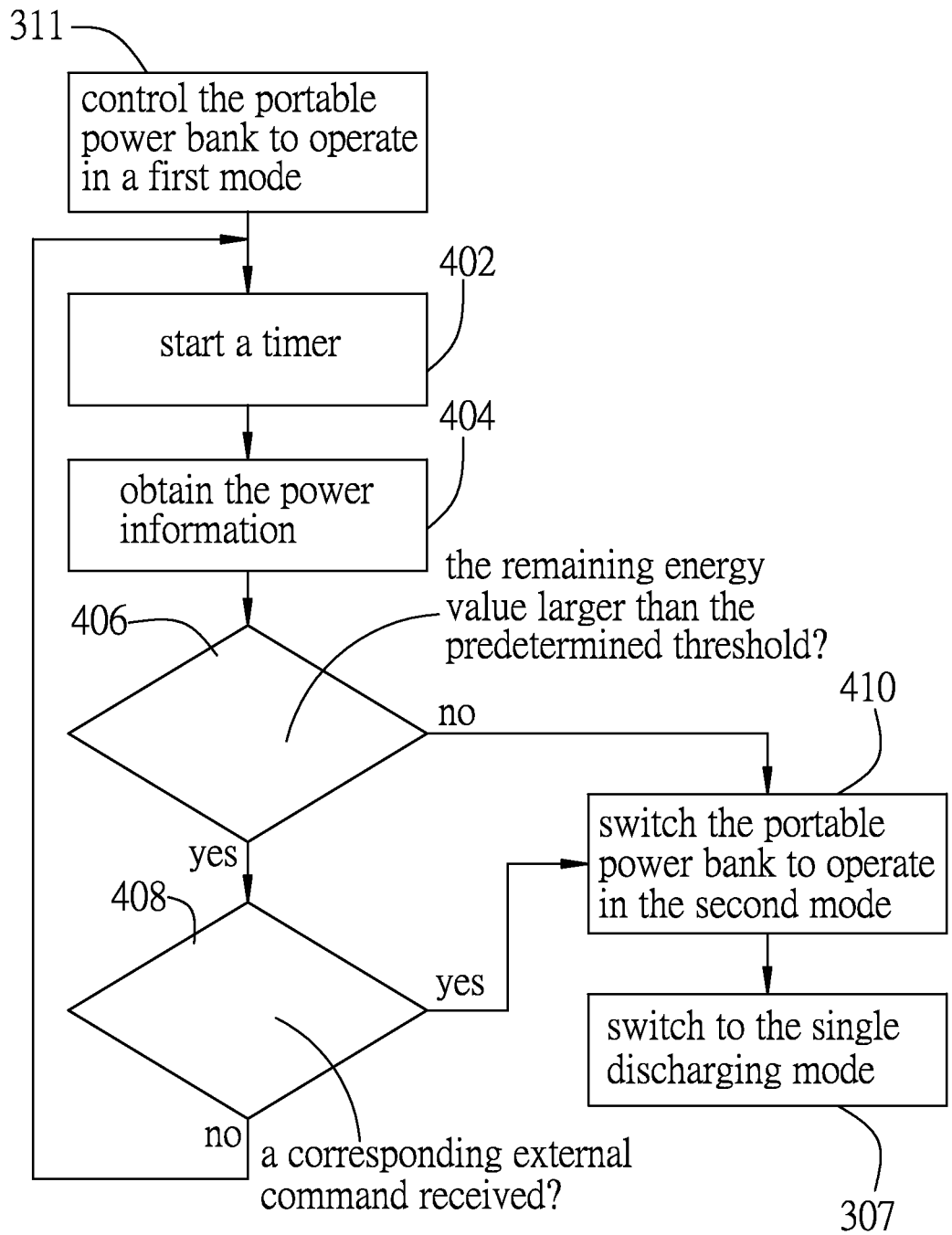
FIG. 4 is a flow chart illustrating steps of a procedure for managing the operation of the portable power bank operating in a first mode.

Further referring to FIG. 4, in this embodiment, the application program may include instructions that, when executed by the processor 21, cause the portable electronic device 2 to perform a procedure for managing the operations of the portable power bank 1 operating in the first mode.

After step 311, in which the portable electronic device 2 controls the portable power bank 1 to switch to the first mode (i.e., to start providing electrical power to the electrical appliance 3), the portable electronic device 2 starts a timer in step 402.

Afterward, in step 404, after the timer indicates that the portable power bank 1 has been operated in the first mode for a predetermined period of time (60 seconds in this embodiment), the portable electronic device 2 requests and obtains the power information from the portable power bank 1.

Then, in step 406, the portable electronic device 2 determines, using the remaining energy value included in the power information, whether the portable power bank 1 has sufficient amount of energy to operate in the first mode. In this embodiment, the determination is done by comparing the remaining energy value and the 40% threshold. When the determination is affirmative, the flow proceeds to step 408. Otherwise, the processor 21 receives a signal from the information acquiring module 11 indicating that the portable power bank 1 does not have sufficient amount of energy, and the flow proceeds to step 410, in which the portable power bank 1 is controlled by the portable electronic device 2 to switched to operate in the second mode, and the second message is generated and outputted by the portable electronic device 2.

In step 408, the portable electronic device 2 detects a corresponding external command by the portable electronic device 2. For example, the user may manually cutoff power provision to the electrical appliance 3. When such a command is received, the flow proceeds to step 410. Otherwise, the portable electronic device 2 determines that the portable power bank 1 is able to maintain operation in the first mode, and the flow goes back to step 402. In other words, the switching operation to the second mode can be triggered by either the components of the portable power bank 1 (via control of the portable electronic device 2) or the user command (via the input interface 25, for example).

In one particular embodiment, there is provided a portable power bank 1 for use with a portable electronic device 2 and an electrical appliance 3. The portable power bank 1 comprises a communication interface 13, a power outputting module 12, a power transferring port 19, a switching unit 142, and a control unit 10.

The communication interface 13 is configured for coupling to the portable electronic device 2. The power outputting module 12 is coupled to the rechargeable battery 15. The power transferring port 19 is configured for coupling to the electrical appliance 3. The switching unit 142 is coupled between the power outputting module 12 and the power transferring port 19, and is operable to make or break a circuit path between the power outputting module 12 and the power transferring port 19. The control unit 10 is coupled to the communication interface 13, the power outputting module 12, and the switching unit 142.

The control unit 10 is responsive to control from the portable electronic device 2 via the communication interface 13 to control the control unit 10 for controlling switching operation of the switching unit 142.

In the embodiment, the portable power bank 1 may further comprise a rechargeable battery 15 and an information acquiring module 11. The information acquiring module 11 is coupled to the rechargeable battery 15 and the control unit 10, and is operable to acquire power information corresponding to the rechargeable battery 15.

The portable power bank 1 may be configured such that the control unit 10 is responsive to an information request received from the portable electronic device 2 via the communication interface 13 to control the information acquiring module 11 for acquiring the power information and to send the power information to the portable electronic device 2 via the communication interface 13.

To sum up, embodiments of this invention incorporate the portable power bank 1 and the portable electronic device 2, with a number of new functions. For example, the user may operate the portable electronic device 2 to control the portable power bank 1 for selectively providing electrical power to the electrical appliance 3. The power information of the portable power bank 1 can be transmitted to the portable electronic device 2 and outputted to notify the user, providing the user with a more comprehensive interface to a status of the portable power bank 1. In addition, when the electrical appliance 3 is enabled to be powered using the portable power bank 1, a separate charger specifically for the electrical appliance 3 will no longer be required.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A portable system capable of providing electric power to an electrical appliance, said portable system comprising:
 a portable electronic device; and
 a portable power bank coupled to said portable electronic device and to be further coupled to the electrical appliance;
 wherein said portable electronic device is configured to
  receive power information from said portable power bank,
  control said portable power bank to operate in a first mode, in which electrical power is provided to the electrical appliance, when said portable electronic device determines from the power information that said portable power bank has sufficient amount of power, and
  control said portable power bank to operate in a second mode, in which electrical power is not provided to the electrical appliance, when said portable electronic device determines from the power information that said portable power bank does not have sufficient amount of power,
 wherein said portable power bank includes:
  a rechargeable battery;
  an information acquiring module coupled to said rechargeable battery and operable to acquire the power information corresponding to said rechargeable battery;
  a communication interface coupled to said portable electronic device;
  a power outputting module coupled to said rechargeable battery;
  a power transferring port configured for coupling to the electrical appliance;
  a switching unit coupled between said power outputting module and said power transferring port and operable to make or break a circuit path between said power outputting module and said power transferring port; and
  a control unit coupled to said information acquiring module, said communication interface, said power outputting module, and said switching unit;
  wherein said portable electronic device is operable to send an information request to said control unit via said communication interface,
  wherein said control unit is responsive to the information request from said portable electronic device to control said information acquiring module for acquiring the power information and to send the power information to said portable electronic device via said communication interface, and
  wherein said portable electronic device is configured to control said control unit for controlling switching operation of said switching unit.

2. The portable system of claim 1, wherein said portable electronic device includes:
 a transmission unit coupled to said portable power bank to receive the power information; and
 processor coupled to said transmission unit and programmed to control operation of said portable power bank in the first and second modes.

3. The portable system of claim 2, wherein said processor is configured to generate a first message for indicating that said portable power bank has sufficient amount of power, and to generate a second message for indicating that said portable power bank does not have sufficient amount of power, said portable electronic device further including an output unit coupled to said processor and controlled by said processor to output the first and second messages generated by said processor.

4. The portable system of claim 1, wherein the power information acquired by said information acquiring module includes an output voltage value corresponding to an output voltage that is outputted by said rechargeable battery, said portable electronic device storing a predetermined threshold and determining whether or not said portable storage bank has sufficient amount of power by comparing the output voltage value included in the power information to the predetermined threshold stored in said portable electronic device.

5. The portable system of claim 1, wherein the power information acquired by said information acquiring module includes a remaining energy value corresponding to a remaining electrical energy of said rechargeable battery that is derived from an open-circuit voltage of said rechargeable battery, said portable electronic device storing a predetermined threshold and determining whether or not said portable power bank has sufficient amount of power by comparing the remaining energy value included in the power information to the predetermined threshold stored in said portable electronic device.

6. The portable system of claim 5, wherein said information acquiring module includes:
   a voltage meter configured to detect the open-circuit voltage of said rechargeable battery; and
   an analog-to-digital converter (ADC) configured to convert the open-circuit voltage detected by said voltage meter to an open-circuit voltage value;
   wherein said control unit is configured to derive the remaining energy value of said rechargeable battery from the open-circuit voltage value obtained by said ADC.

7. The portable system of claim 1, wherein:
   after controlling said control unit to operate said portable power bank in the first mode for a predetermined period of time, said portable electronic device is configured to control said control unit to switch operation of said portable power bank from the first mode to the second mode when a predetermined condition is met, the predetermined condition being one of: said portable power bank does not have sufficient amount of power; and receipt of a corresponding external command by said portable electronic device.

8. The portable system of claim 1, wherein sizes of said portable power bank and said portable electronic device are close to that of the electrical appliance.

9. A portable power bank for use with a portable electronic device and an electrical appliance, said portable power bank comprising:
   a communication interface configured for coupling to the portable electronic device;
   a power outputting module;
   a power transferring port configured for coupling to the electrical appliance;
   a switching unit coupled between said power outputting module and said power transferring port and operable to make or break a circuit path between said power outputting module and said power transferring port;
   a control unit coupled to said communication interface, said power outputting module, and said switching unit;
   a rechargeable battery coupled to said power outputting module; and
   an information acquiring module coupled to said rechargeable battery and said control unit, and operable to acquire power information corresponding to said rechargeable battery,
   wherein said control unit is responsive to control from the portable electronic device via said communication interface to control said control unit for controlling switching operation of said switching unit, and
   wherein said control unit is responsive to an information request received from the portable electronic device via said communication interface to control said information acquiring module for acquiring the power information and to send the power information to the portable electronic device via said communication interface.

10. The portable power bank of claim 9, wherein the power information acquired by said information acquiring module includes an output voltage value corresponding to an output voltage that is outputted by said rechargeable battery.

11. The portable power bank of claim 9, wherein the power information acquired by said information acquiring module includes a remaining energy value corresponding to a remaining electrical energy of said rechargeable battery that is derived from an open-circuit voltage of said rechargeable battery.

12. The portable power bank of claim 11, wherein said information acquiring module includes:
   a voltage meter configured to detect the open-circuit voltage of said rechargeable battery; and
   an analog-to-digital converter (ADC) configured to convert the open-circuit voltage detected by said voltage meter to an open-circuit voltage value;
   wherein said control unit is configured to derive the remaining energy value of said rechargeable battery from the open-circuit voltage value obtained by said ADC.

* * * * *